United States Patent
Gwidt et al.

(10) Patent No.: US 7,779,810 B2
(45) Date of Patent: Aug. 24, 2010

(54) IDLE STABILITY IMPROVEMENT FOR DIRECT INJECTED ENGINES

(75) Inventors: Jesse M. Gwidt, Brighton, MI (US); David P. Sczomak, Troy, MI (US); Michael J. Lucido, Northville, MI (US); James R. Reeder, Jr., Howell, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 11/531,444

(22) Filed: Sep. 13, 2006

(65) Prior Publication Data

US 2008/0060610 A1  Mar. 13, 2008

(51) Int. Cl.
F02D 41/00 (2006.01)

(52) U.S. Cl. .............. 123/339.14; 123/339.1; 701/103; 701/113

(58) Field of Classification Search .......... 123/305, 123/339, 299, 339.1, 339.14; 701/103, 104, 701/113
See application file for complete search history.

(56) References Cited

U.S. PATENT DOCUMENTS

| 5,604,304 | A | * | 2/1997 | Kokubo et al. | 73/117.3 |
| 5,713,328 | A | * | 2/1998 | Anderson et al. | 123/299 |
| 5,979,400 | A | * | 11/1999 | Nishide | 123/305 |
| 6,880,518 | B2 | * | 4/2005 | Shiraishi et al. | 123/295 |
| 2002/0050265 | A1 | * | 5/2002 | Yoshida et al. | 123/295 |
| 2003/0217733 | A1 | * | 11/2003 | Shiraishi et al. | 123/295 |
| 2005/0016492 | A1 | * | 1/2005 | Matthews | 123/198 F |

FOREIGN PATENT DOCUMENTS

| GB | 2404746 A | * | 2/2005 |
| JP | 2003106183 A | * | 4/2003 |

* cited by examiner

Primary Examiner—Stephen K Cronin
Assistant Examiner—J. Page Hufty

(57) ABSTRACT

A fuel injection method for internal combustion engines with gasoline direct fuel injection systems comprises receiving a crankshaft position signal from a crankshaft position sensor. A position of a crankshaft is determined from the crankshaft position signal. Fuel is commanded at a first rate when the position of the crankshaft is within a first selectable range during a combustion cycle of an engine cylinder and fuel is commanded at a second rate when the position of the crankshaft is within a second selectable range during the combustion cycle of the engine cylinder.

19 Claims, 3 Drawing Sheets

IDLE STABILITY IMPROVEMENT FOR DIRECT INJECTED ENGINES

FIELD OF THE INVENTION

The present invention relates to methods and systems for gasoline direct fuel injection and particularly for improving idle stability for internal combustion engines with gasoline direct fuel injection.

BACKGROUND OF THE INVENTION

Controlling the amount of fuel and air to be delivered per cylinder for a four stroke internal combustion engine is important to achieve optimum performance. Proper timing of intake and exhaust valves also provide for better performance. Conventional engines include camshafts that regulate the timing of the valves. The rotation of the camshaft can be controlled to ensure proper timing of each valve. In addition cam phasers may be included to alter the position of the camshafts relative to the crankshaft which provides for further opportunities to properly adjust the timing of each valve.

In order to achieve greater engine power, conventional engine valve lift profiles and valve timing designs favor high revolution per minute (RPM) conditions. These designs tend to compromise engine performance at low RPM conditions. This compromise can result in combustion instability at idle, a low RPM condition. Combustion instability may be perceived by a driver as undesirable.

SUMMARY OF THE INVENTION

Accordingly, a fuel injection method for internal combustion engines with gasoline direct fuel injection systems according to the present invention comprises receiving a crankshaft position signal from a crankshaft position sensor. A position of a crankshaft is determined from the crankshaft position signal. Fuel is commanded at a first rate when the position of the crankshaft is within a first selectable range during a combustion cycle of an engine cylinder and fuel is commanded at a second rate when the position of the crankshaft is within a second selectable range during the combustion cycle of the engine cylinder.

In one other feature, the method further comprises commanding spark when the position of the crankshaft is near top dead center.

In another feature, commanding fuel at the first rate and commanding fuel at the second rate is performed during idle operating conditions.

In other features, the first selectable range is between a range of two hundred and fifty and three hundred and eighty degrees of crank rotation before top dead center firing. The second selectable range is between a range of zero and one hundred and eighty degrees of crank rotation before top dead center firing.

In still other features, the second selectable range is defined by twenty and ninety degrees of crank rotation before top dead center firing. The first selectable range is defined by two hundred and seventy and three hundred and thirty degrees of crank rotation before top dead center firing.

In still other features, the first rate is based on a selectable percentage of a total fuel desired for the combustion stroke. The second rate is based on a selectable percentage of a total fuel desired for said combustion stroke.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
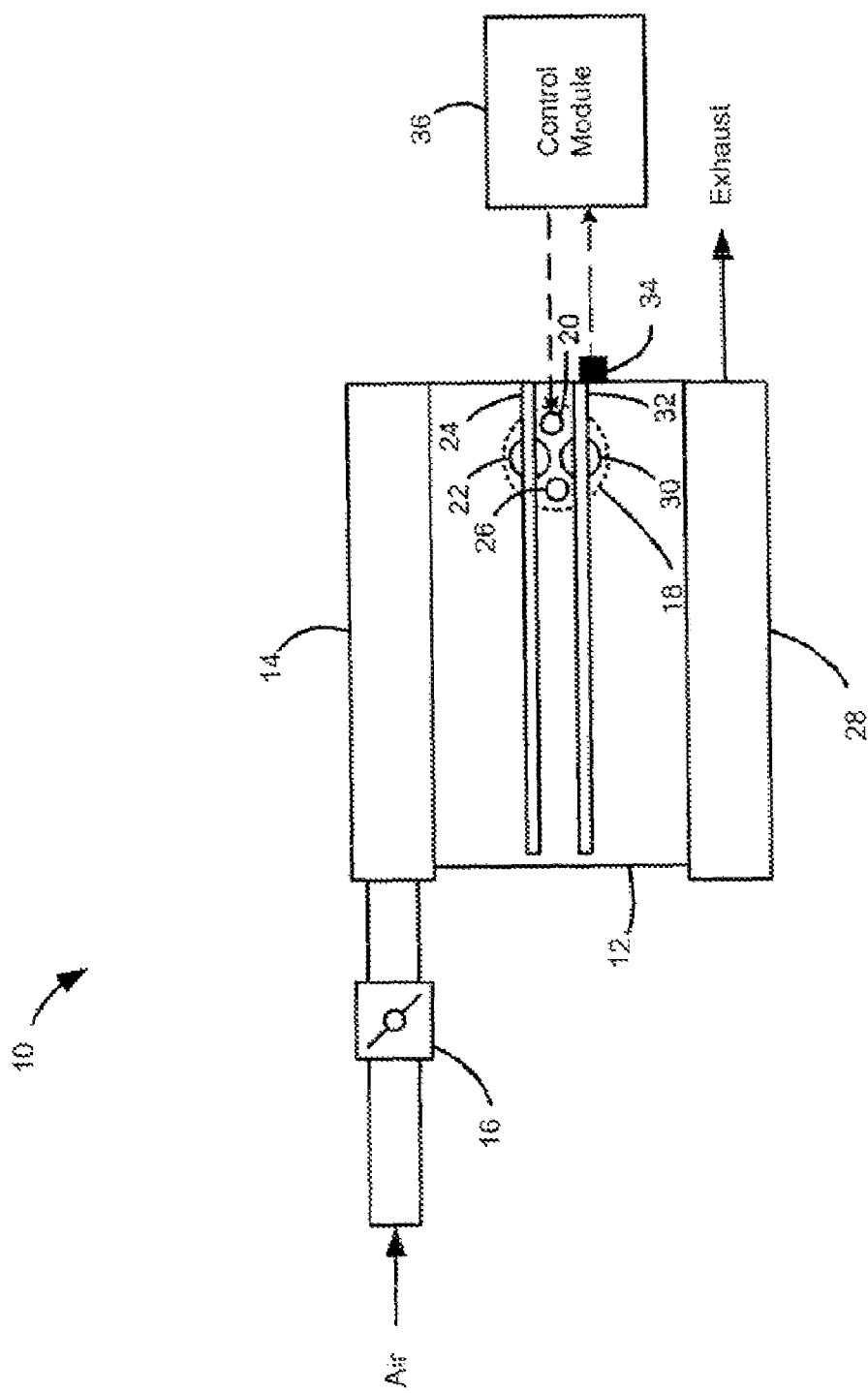
FIG. 1 is a functional block diagram illustrating an internal combustion engine system including direct fuel injection hardware.

The following description of the preferred embodiment(s) is merely exemplary in nature and is in no way intended to limit the invention, its application, or uses. For purposes of clarity, the same reference numbers will be used in the drawings to identify the same elements. As used herein, the term module and/or device refers to an application specific integrated circuit (ASIC), an electronic circuit, a processor (shared, dedicated, or group) and memory that execute one or more software or firmware programs, a combinational logic circuit and/or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although a single cylinder 18 is illustrated, it can be appreciated that the engine can have a plurality of cylinders including, but not limited to, 2, 3, 5, 6, 8, 10, 12 and 16 cylinders.

A fuel injector 20 is electronically controlled to inject fuel into the cylinder 18. Fuel is combined with air as it is drawn into the cylinder 18 through an intake port. An intake valve 22 selectively opens and closes to enable the air to enter the cylinder 18. The intake valve position is regulated by an intake camshaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque. Combustion exhaust within the cylinder 18 is forced out through an exhaust manifold 28 when an exhaust valve 30 is in an open position. The exhaust valve position is regulated by an exhaust camshaft 32. The exhaust can then be treated in an exhaust system (not shown). Although single intake and exhaust valves 22,30 are illustrated, it can be appreciated that the engine 12 can include multiple intake and exhaust valves 22,30 per cylinder 18.

A crankshaft sensor 34 senses a position of the crankshaft and generates a crankshaft signal. A control module 36 according to the present invention receives the crankshaft signal, interprets the signal as degrees of rotation and schedules the injection of fuel in a cylinder based on the interpretation of the signal. The control module 36 sends a fuel delivery signal to the fuel injector to control the amount and the timing of the fuel delivery. The fuel delivery signal can be a pulse width modulated signal where the pulse width regulates the amount of fuel delivered to the cylinder.

Figure 2:
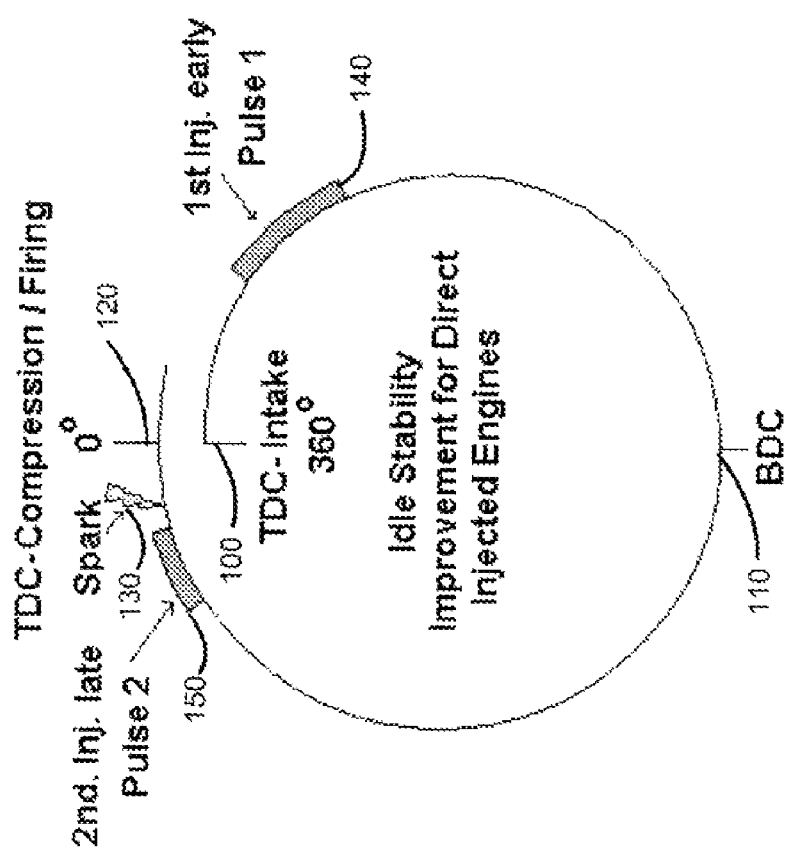
FIG. 2 is a timing diagram illustrating the scheduling of fuel injection events according to the present invention.

Referring now to FIG. 2, a timing diagram for scheduling fuel injection delivery events according to the present invention is shown. Fuel injection events can be scheduled according to the crankshaft position indicated in degrees of crank rotation. The crankshaft signal can be interpreted as a position in crank degrees. The diagram illustrates the position of the crankshaft in crank degrees during a combustion cycle. The combustion cycle includes the piston performing the intake stroke and the combustion stroke. The piston begins the intake stroke at three hundred sixty (360) crank rotation degrees before top dead center at 100. The piston begins the compression stroke at one hundred eighty (180) crank rotation degrees before top dead center or at bottom dead center (BDC) at 110. The piston ends the compression stroke at top dead center or zero (0) crank rotation degrees shown at 120. Firing of spark occurs near top dead center of the compression stroke at 130. In an exemplary embodiment firing occurs between ten (10) and zero (0) crank degrees before top dead center.

During idle operating conditions, according to the present invention, the control module commands two fuel injection events per cylinder per combustion cycle. The first injection event is scheduled early in the combustion cycle and can be scheduled anywhere between two hundred fifty (250) and three hundred eighty (380) crank degrees before firing of spark. This timing is normal for homogeneous operating conditions. An exemplary range for scheduling the first fuel delivery is between two hundred and seventy (270) and three hundred and thirty (330) crank degrees before firing of spark as shown at 140. The amount of fuel delivery however, is reduced compared to homogeneous operating conditions. In an exemplary embodiment, the amount of fuel delivered is between twenty (20) and ninety (90) percent of the total required fuel for the combustion stroke.

The second fuel injection event is scheduled late in the combustion cycle and can be scheduled anywhere between zero (0) and one hundred eighty (180) crank degrees before firing of spark. An exemplary range for scheduling the second fuel delivery is between twenty (20) and ninety (90) crank degrees before firing of spark as shown at 150. The second injection event injects the remainder of fuel necessary for the combustion cycle. An exemplary amount includes ten (10) to eighty percent (80) of the total fuel required for the combustion stroke.

Figure 3:
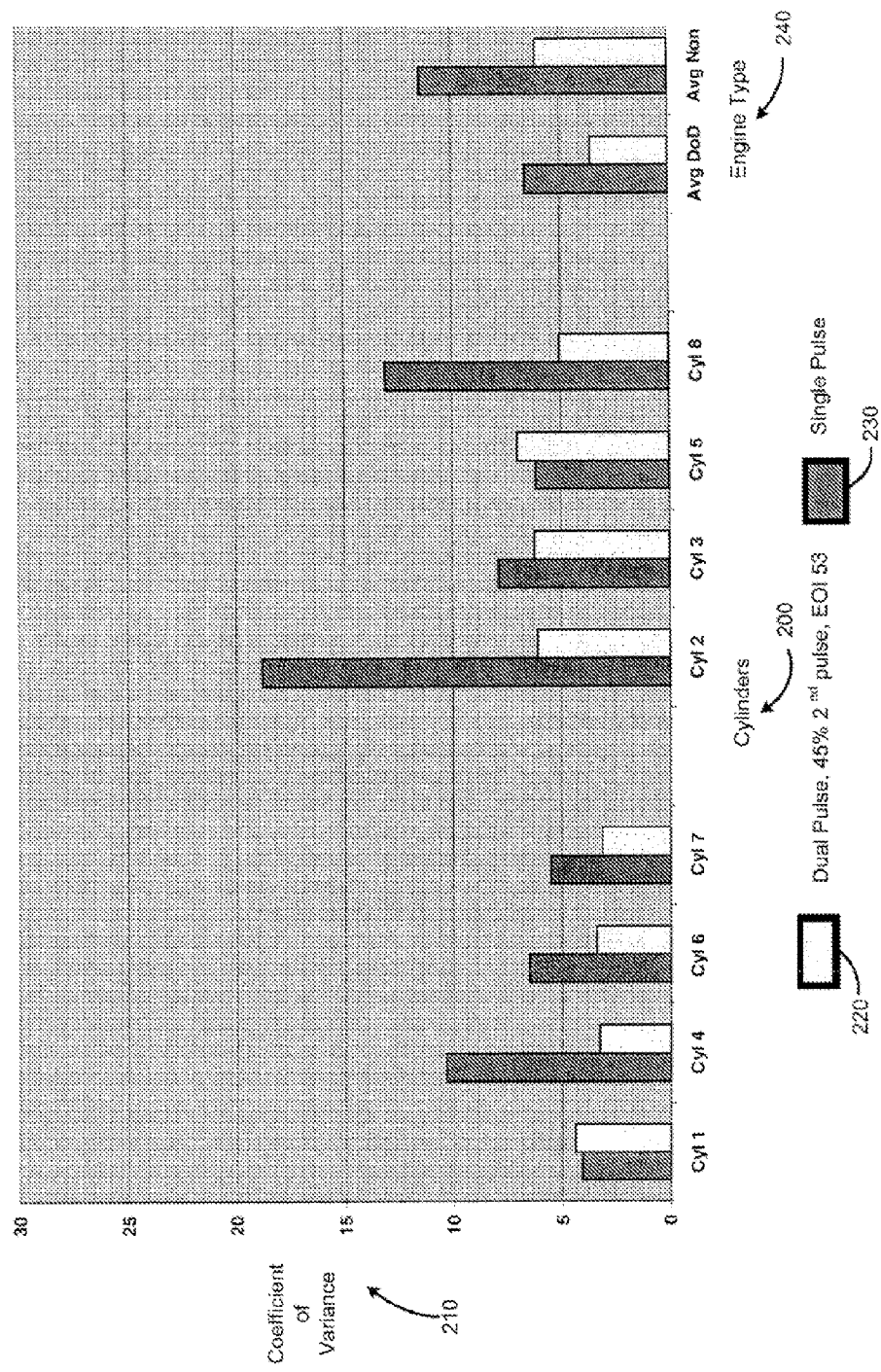
FIG. 3 is a bar graph illustrating the effects of commanding fuel injection events according to the present invention.

Referring now to FIG. 3, a bar graph illustrating the effects of commanding two fuel injection events per combustion cycle per cylinder for an eight cylinder engine is shown. Cylinders one (1) through eight (8) of the engine are represented along the x-axis in firing order at 200. A coefficient of variance (COV) of the indicated mean-effective pressure (IMEP) is represented along the y-axis ranging from zero (0) to thirty (30) at 210. Results for a single injection are indicated at 230. Results for a dual injection are indicated at 220. As shown, the COV of IMEP improves with the second injection. The second injection increases in-cylinder motion and creates a rich area near the spark plug. The richness increases combustion stability. The increased combustion stability can be perceived as a "smooth" idle by the operator of the vehicle including the engine system.

In an alternative embodiment the use of dual injection events can be implemented in displacement on demand engines where the control module selectively deactivates cylinders of the engine under low load operating conditions. For example, an eight cylinder engine can be operated using four cylinders to improve fuel economy by reducing pumping losses. Results of the total average for a non-DOD engine and DOD engine are shown by the last two columns of the bar graph at 240.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings: the specification and the following claims.

What is claimed is:

1. A control method for internal combustion engines with gasoline direct fuel injection systems, comprising:
   receiving a crankshaft position signal from a crankshaft position sensor;
   interpreting the crankshaft position signal;
   determining a crankshaft position based on the interpretation of said crankshaft position signal; and
   during idle operating conditions, reducing a coefficient of variance (COV) of indicated mean-effective pressure (IMEP) relative to single pulse fuel injection by:
   commanding fuel at a first rate when said position of said crankshaft is within a first selectable range during a combustion cycle of an engine cylinder;
   commanding fuel at a second rate not equal to zero when said position of said crankshaft is within a second selectable range during said combustion cycle of said engine cylinder; and
   commanding spark when said position of said crankshaft is within a third selectable range during said combustion cycle of said engine cylinder,
   wherein commanding fuel at said first rate, commanding fuel at said second rate, and commanding spark are scheduled based on the determination of the crankshaft position.

2. The method of claim 1 wherein said commanding spark further comprises commanding spark when said position of said crankshaft is near top dead center.

3. The method of claim 1 wherein said first selectable range is between a range of two hundred and fifty and three hundred and eighty degrees of crank rotation before commanding said spark.

4. The method of claim 1 wherein said second selectable range is between a range of zero and one hundred and eighty degrees of crank rotation before commanding said spark.

5. The method of claim 1 wherein said second selectable range is defined by twenty and ninety degrees of crank rotation before commanding said spark.

6. The method of claim 1 wherein said first range is defined by two hundred and seventy and three hundred and thirty degrees of crank rotation before commanding said spark.

7. The method of claim 1 wherein said first rate is based on a selectable percentage of a total fuel desired for said combustion cycle.

8. The method of claim 7 wherein said selectable percentage is between twenty and ninety percent of total fuel desired fuel for said combustion cycle.

9. The method of claim 1 wherein said second rate is based on a selectable percentage of a total fuel desired for said combustion cycle.

10. The method of claim 9 wherein said selectable percentage is between ten and eighty percent of fuel desired for said combustion cycle.

11. A control system for an internal combustion engine with a gasoline direct fuel injection system, comprising:

a crankshaft position input device that receives a crankshaft position signal; and a control module that interprets the crankshaft position signal, that determines a crankshaft position based on the interpretation of the crankshaft position signal, and that reduces a coefficient of variance (COV) of indicated mean-effective pressure (IMEP) relative to single pulse fuel injection by commanding fuel at a first rate and again at a second rate not equal to zero during a single combustion cycle of a cylinder while said engine is operating under idle conditions and by commanding spark during said single combustion cycle of said engine cylinder, wherein commanding fuel at said first rate, commanding fuel at said second rate, and commanding spark are scheduled based on the determination of the crankshaft position.

12. The system of claim 11 wherein said control module commands fuel at said first rate and said second rate when said crankshaft position signal indicates a crankshaft position within first and second selectable ranges respectively.

13. The system of claim 12 wherein said first selectable range is between two hundred and fifty and three hundred and eighty crank rotation degrees before spark is commanded near top dead center.

14. The system of claim 12 wherein said second selectable range is between zero and one hundred and eighty crank rotation degrees before spark is commanded near top dead center.

15. The system of claim 11 wherein said control module determines said first and second rates based on a total fuel required for the combustion cycle and wherein said total fuel required is determined from engine operating conditions and torque requests.

16. The system of claim 15 wherein said first and second rates are based on a first and a second selectable percentage of said total fuel required for the combustion cycle, wherein said first selectable amount is greater than said second selectable amount.

17. The system of claim 16 wherein said first selectable percentage is between twenty and ninety percent of said total fuel.

18. The system of claim 11 wherein said internal combustion engine is a displacement on demand engine.

19. An engine system, comprising:

an engine that selectively deactivates one or more cylinders during operation;

a crankshaft position sensor that generates a crankshaft position signal; and a control module that interprets the crankshaft position signal, that determines a crankshaft position based on the interpretation of the crankshaft position signal, and that reduces a coefficient of variance (COV) of indicated mean-effective pressure (IMEP) relative to single pulse fuel injection by commanding fuel to said engine at a first rate and again at a second rate during a single combustion cycle while said engine is operating under idle conditions, wherein commanding fuel to said engine at said first rate and again at said second rate is scheduled based on the determination of the crankshaft position.

* * * * *